(12) United States Patent
Lasecki

(10) Patent No.: US 8,844,713 B2
(45) Date of Patent: Sep. 30, 2014

(54) CONVEYOR BELT LINK WITH WEAR RESISTANCE FEATURES

(75) Inventor: Jonathan R. Lasecki, Strasburg, VA (US)

(73) Assignee: Ashworth Bros., Inc., Fall River, MA (US)

( * ) Notice: Subject to any disclaimer, the term of this patent is extended or adjusted under 35 U.S.C. 154(b) by 12 days.

(21) Appl. No.: 13/412,988

(22) Filed: Mar. 6, 2012

(65) Prior Publication Data

US 2013/0233681 A1 Sep. 12, 2013

(51) Int. Cl.
*B65G 17/06* (2006.01)

(52) U.S. Cl.
USPC ............ 198/851; 198/853; 403/179; 403/270

(58) Field of Classification Search
USPC ............. 198/8, 730, 851, 852, 853; 403/179, 403/270; 148/516
See application file for complete search history.

(56) References Cited

U.S. PATENT DOCUMENTS

| | | | |
|---|---|---|---|
| 3,800,400 A * | 4/1974 | Mistarz et al. ............... 29/426.3 |
| 4,078,655 A | 3/1978 | Roinestad |
| 5,558,208 A | 9/1996 | Kucharski |
| 5,954,187 A | 9/1999 | Hager |
| 5,954,188 A | 9/1999 | Etherington et al. |
| 6,195,868 B1 | 3/2001 | Etherington et al. |
| 6,202,833 B1 | 3/2001 | Greer |
| 6,360,882 B1 * | 3/2002 | Maine, Jr. et al. ............ 198/852 |
| 6,371,284 B1 | 4/2002 | Pasch |
| 7,410,047 B2 | 8/2008 | van Faassen |
| 7,735,637 B2 | 6/2010 | Montgomery et al. |
| 2007/0051588 A1 | 3/2007 | Russell |
| 2008/0169173 A1 | 7/2008 | Montgomery et al. |
| 2009/0242360 A1 | 10/2009 | Hall |
| 2010/0043348 A1 * | 2/2010 | Houghton et al. ............... 52/846 |
| 2010/0115753 A1 * | 5/2010 | Underberg et al. ............. 29/428 |
| 2010/0236902 A1 * | 9/2010 | Montgomery et al. ....... 198/853 |
| 2011/0278135 A1 * | 11/2011 | Montgomery et al. ....... 198/848 |

FOREIGN PATENT DOCUMENTS

| | | | |
|---|---|---|---|
| EP | 1192096 B1 * | 12/2003 | ............ B65G 17/06 |
| JP | 11059846 | 3/1999 | |
| JP | 2009078909 | 4/2009 | |
| JP | 2012020830 | 2/2012 | |

OTHER PUBLICATIONS

International Search Report and Written Opinion mailed Jul. 9, 2013, in International Application No. PCT/US2013/028993.
Notice of Allowance mailed on Aug. 16, 2013 in connection with U.S. Appl. No. 13/311,888, filed Dec. 6, 2011; 8 pages.

* cited by examiner

*Primary Examiner* — Gene Crawford
*Assistant Examiner* — Lester Rushin
(74) *Attorney, Agent, or Firm* — Plumsea Law Group, LLC

(57) ABSTRACT

A conveyor belt is provided that includes a link having a leg formed of a link leg material, wherein the leg includes an outer link surface configured to face the drive surface, the link leg being configured to receive a rod. The conveyor belt may include an aperture extending through the leg, wherein the rod is disposed within the aperture. Also, the conveyor belt may include a first weld that attaches the free end of the rod to the outer link surface, the first weld comprising a first weld material and a second weld made of a second weld material, wherein the second weld covers at least a portion of the first weld and forms an outermost surface of the conveyor belt. The second weld material may be different from the first weld material, and may be more resistant to wear than the first weld material.

46 Claims, 12 Drawing Sheets

CONVEYOR BELT LINK WITH WEAR RESISTANCE FEATURES

FIELD OF THE INVENTION

The present disclosure is directed generally to conveyor belts made from a plurality of longitudinally spaced rods coupled with interlocking links. More particularly, the present disclosure is directed to conveyor belts utilizing links having wear resistant welds.

BACKGROUND

Conveyor belts are popularly used in a number of different industrial fields to provide continuous motion of goods during manufacture, shipping, and other processes. Industrial conveyor belts generally include a series of spaced apart rods connected via a series of interlocking links which are welded to the rods. For the manufacture of small items, the rods may be covered with a fabric, plastic, or metal overlay, such as a mesh, to prevent the small items from slipping between the rods and falling to the manufacturing floor. A typical conveyor belt 10 is shown in FIG. 1, which corresponds to FIG. 1 of U.S. Pat. No. 5,954,188, which is incorporated herein by reference. Conveyor belt 10 includes rods 20 connected by links 22 covered by a mesh 14.

In some cases, a buttonhead 32 may be formed on the ends of rods 20 to act as a stop for links 22. A weld is also typically formed between buttonhead 32 and link 22 for a stronger and more secure connection between rods 20 and links 22. In other cases, a buttonless configuration may be employed, wherein the rod is welded to the link without creating a significant protrusion beyond the leg of the link. In either type of cases, the weld and/or the buttonhead may contact a drum or other device that propels or guides the conveyor belt by contacting the sides of the conveyor belt. This contact with the sides of the conveyor belt can cause wear of the belt components. In some cases, welds and/or buttonheads may be worn down and/or broken off due to contact with the drum, leading to failure of the belt.

Systems have been developed to reinforce conveyor belts against wear from drums and other types of belt propulsion devices. For example, some systems include links having outer legs with extensions that extend from the leg beyond the buttonhead, cover over an end face of the buttonhead, and contact the drum. However, this type of system may be more complicated to manufacture and/or assemble. In addition, this type of system may use a significant amount of additional material, which may add expense, and/or weight.

The present disclosure is directed to improvements in wear prevention features for conveyor belts.

SUMMARY

In one aspect, the present disclosure is directed to a conveyor belt configured to contact a drive surface. The conveyor belt may include a rod having a free end, wherein the rod comprises an elongated portion of a rod material. The conveyor belt may also include a link having a leg formed of a link leg material and configured to receive the rod, wherein the leg includes an outer link surface configured to face the drive surface. In addition, the conveyor belt may include an aperture extending through the leg, wherein the rod is disposed within the aperture. Also, the conveyor belt may include a first weld that attaches the free end of the rod to the outer link surface, the first weld comprising a first weld material and a second weld made of a second weld material, wherein the second weld covers at least a portion of the first weld and forms an outermost surface of the conveyor belt configured to contact the drive surface. The second weld material may be different from the first weld material, and may be more resistant to wear due to contact with the drive surface than the first weld material.

In another aspect, the present disclosure is directed to a conveyor belt configured to contact a drive surface. The conveyor belt may include a rod having a free end, wherein the rod comprises an elongated portion of a rod material. In addition, the conveyor belt may include a link having a leg formed of a link leg material and configured to receive the rod, wherein the leg includes an outer link surface configured to face the drive surface. Also, the conveyor belt may include an aperture extending through the leg, wherein the rod is disposed within the aperture. Further, the conveyor belt may include a weld that attaches the free end of the rod to the outer link surface and forms an outermost surface of the conveyor belt configured to contact the drive surface, the weld comprising a weld material, wherein the weld material is more resistant to wear due to contact with the drive surface than the rod material and the link leg material.

In another aspect, the present disclosure is directed to a conveyor belt configured to contact a drive surface. The conveyor belt may include a rod having a free end, wherein the rod comprises an elongated portion of a rod material. The conveyor belt may also include a link having a leg formed of a link leg material and configured to receive the rod, wherein the leg includes an outer link surface configured to face the drive surface. Further, the conveyor belt may include an aperture extending through the leg, wherein the rod is disposed within the aperture. In addition, the conveyor belt may include a first attachment fixedly attaching the free end of the rod to the link leg, the first attachment comprising a first attachment material; and a second attachment made of a second attachment material, wherein the second attachment covers at least a portion of an end face of the rod and forms an outermost surface of the conveyor belt configured to contact the drive surface. The second attachment material may be different from the first attachment material, and the second attachment material may be more resistant to wear due to contact with the drive surface than the first weld material.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
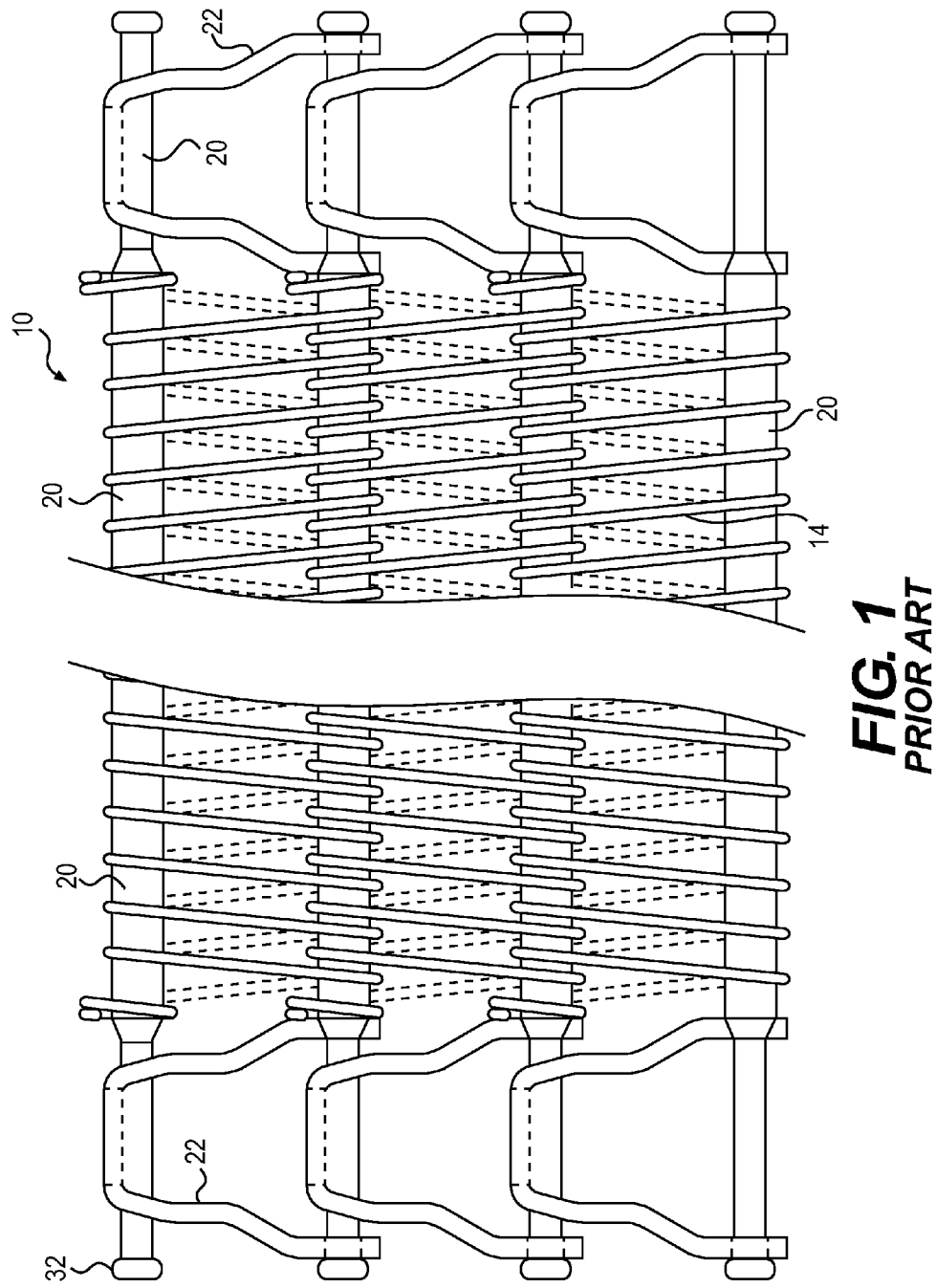
FIG. 1 is a schematic view of a prior art conveyor belt incorporating rods with buttonheads.
Figure 2:
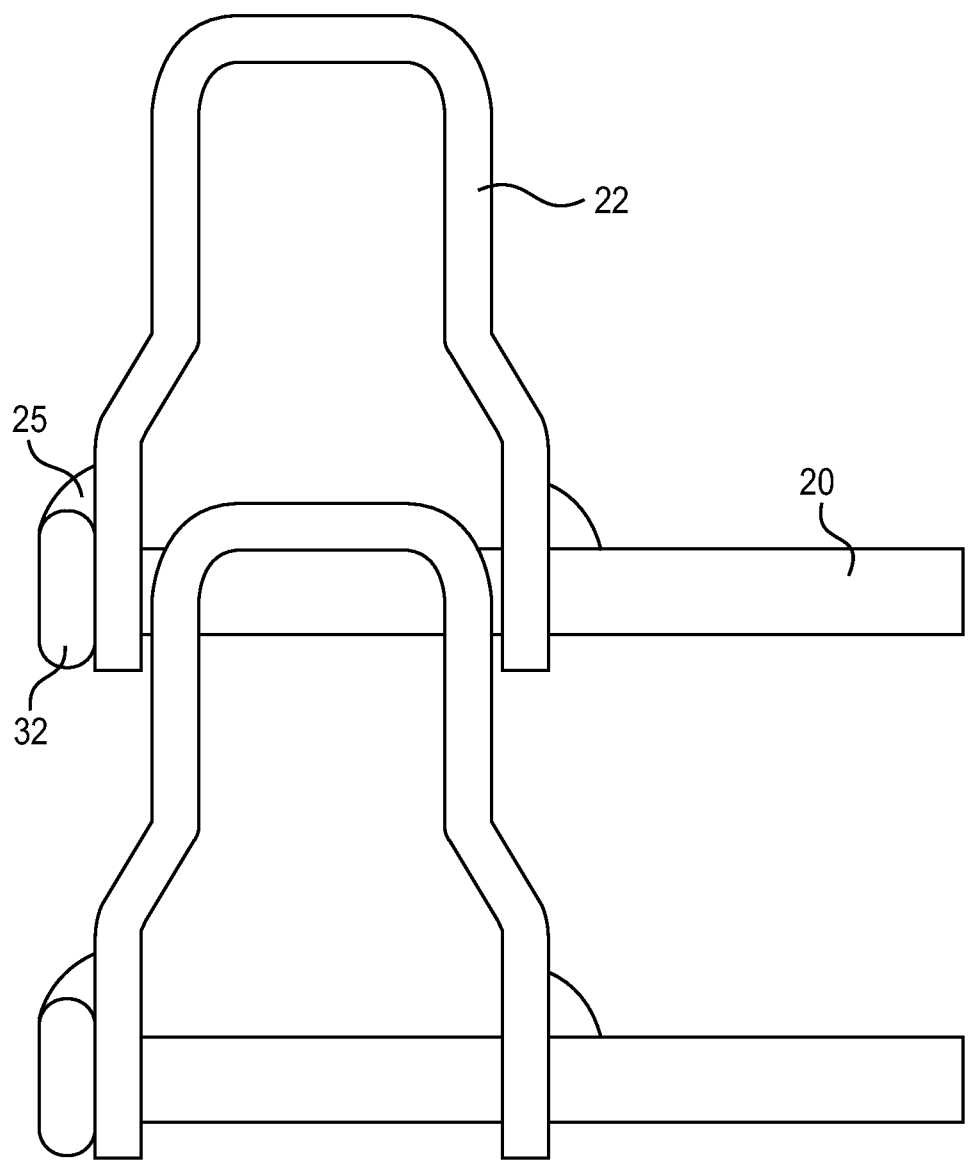
FIG. 2 is a schematic view of a link of a prior art conveyor belt link on a buttonhead rod.

FIG. 1 shows a prior art conveyor belt 10 formed from rods 20 connected together with links 22 as disclosed in U.S. Pat. No. 5,954,188. A wire mesh overlay 14 covers rods 20 between links 22 to provide additional support for the goods transported on conveyor belt 10. As shown in FIG. 2, which shows an enlarged view of a portion of conveyor belt 10, rods 20 are formed with buttonheads 32. Buttonheads 32 assist in keeping links 22 in position. Rods 20 are connected to links 22 via buttonheads 32, such as with welds 25.

For purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding, brazing, soldering, other types of thermal bonding, and/or other joining techniques. In addition, two components may be "fixedly attached" by virtue of being integrally formed, for example, in a molding process.

Figure 3:
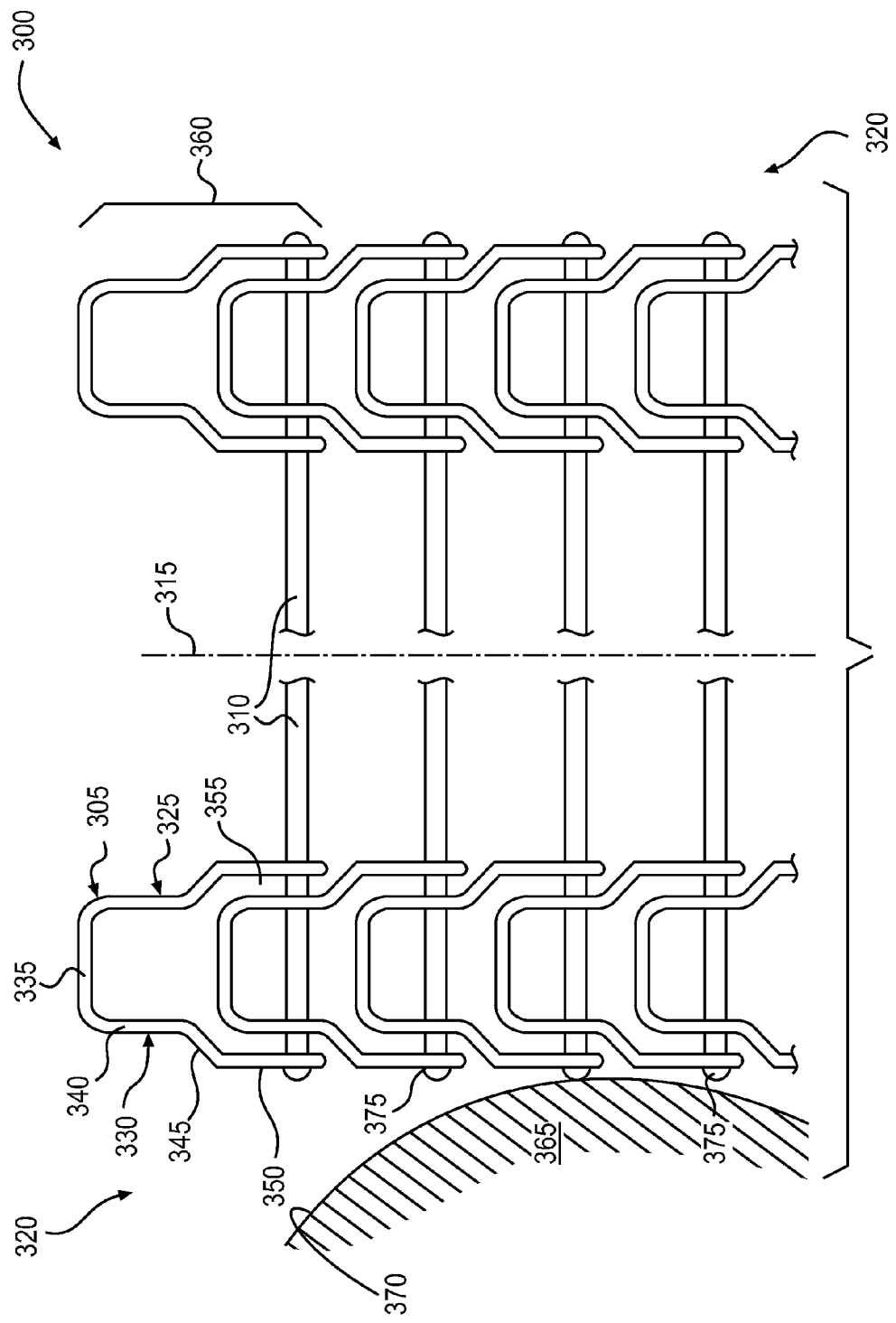
FIG. 3 is a schematic top view of an exemplary conveyor belt embodiment.

FIG. 3 shows a top view of an exemplary conveyor belt 300. As illustrated in FIG. 3, conveyor belt 300 may include a plurality of links 305 connected by a plurality of elongated rods 305. A center line 315 indicates the approximate midline of conveyor belt 300. Conveyor belt 300 may include outer ends 320. For purposes of this disclosure, the term "outer," as used in this description and the appended claims, shall refer to a direction toward outer ends 320 of conveyor belt 300 and away from center line 315. Conversely, the term "inner" shall refer to a direction toward center line 315 and away from outer ends 320 of conveyor belt 300. In addition, for purposes of this disclosure, the term "longitudinal direction" shall refer to the direction in which center line 315 is oriented.

As shown in FIG. 3, all of rods 310 may be substantially similar in shape and dimension, with each of rods 310 being an elongated cylindrical body formed of an elongated portion of a rod material. In some embodiments, rods 310 may be made from a metal material, such as steel, stainless steel, aluminum, titanium, and/or other metals. In other embodiments, rods 310 may be made from a non-metallic material, such as plastic, wood, carbon fiber, and/or other non-metallic materials. In some embodiments, rod 310 may be a substantially hollow tube or pipe. In other embodiments, rod 310 may be solid.

The inner portions of rods 310 (near center line 315) are truncated in FIG. 3 for purposes of illustration. Rods 310 may be any suitable length for supporting and carrying a variety of wares. In some embodiments, rods 310 may have a uniform or substantially uniform diameter along the length of the cylindrical body. The diameter may be selected based upon factors such as the type of goods being moved on conveyor belt 300, the width of conveyor belt 300, and/or other considerations. In some embodiments, rods 310 may include tapering or stepped configurations.

As shown in FIG. 3, rods 310 may be operatively connected to each other with links 305. In some embodiments, links 305 may have a general U-shape, wherein each link 305 is constructed with two legs, including an inner leg 325 and an outer leg 330, joined by a connecting member 335. In some embodiments, inner leg 325 and outer leg 330 may be mirror-image forms. Accordingly, as the configuration of inner leg 325 and outer leg 330 are identical save for opposing orientation, for the sake of clarity, only the structure of outer leg 330 is discussed with particularity. Outer leg 330 may include a relatively straight upper portion 340 connected by an outwardly-tapering transition region 345 to a relatively straight lower portion 350. This configuration creates a wider lower opening 355 to allow for the interconnection of links 305, as connecting member 335 of one link may readily slide into a nesting relationship with lower portion 350 of an adjacent link. In some embodiments, the fitment of one link within another may be a relatively loose fitment, allowing several millimeters of lateral movement between the components. In other embodiments, the fitment may be substantially tighter, leaving only minimal space between the components, and thus, maintaining the links in a consistent alignment when nested.

It will be appreciated that the form of the links joining together elongate rods is not limited to the configurations shown and discussed in the present disclosure. In some embodiments, the configuration of the connective links may be simpler than link 305. For example, in some embodiments, each leg of the link may include a single straight portion. Alternatively, the configuration of the connective link may be more involved for certain applications. For example, embodiments are envisioned wherein the connective links have more bends and/or a more complex shape than link 305. In addition, although inner leg 325 and outer leg 330 are shown in the accompanying drawings as having mirror images of each other to provide symmetry for link 305, in other embodiments, link 305 may be asymmetrical.

Each rod 310 may be fixedly attached to two links 305 (for example by welding), one at each end of the rod, forming a belt segment 360. Belt segments 360 may be rotatably connected to one another. For example, as explained in greater detail below, each rod 310 may pass through openings in upper portions 340 of outer legs 330 and through corresponding openings in inner legs 325. While rods 310 may be fixedly attached to outer leg 330 in lower portion 350, rods 310 may be free to rotate within the openings in upper portions 340 and the counterpart openings in inner legs 325. In addition, as will also be explained in greater detail below, conveyor belt 300 may be a collapsible type of conveyor belt. That is, the belt segments may be movable longitudinally with respect to one another. In order to facilitate this longitudinal collapsibility, the openings in upper portions 340 of outer legs 330 and counterpart openings in inner legs 325 may be longitudinally slotted, thus allowing for longitudinal translation of a rod of a given belt segment 360 within a link of an adjoining belt segment.

Conveyor belt 300 may be collapsible at both outer ends 320 or at only one of outer ends 320. Further, in some embodiments, outer ends 320 may be independently collapsible, that is, each end 320 may be collapsible independent of the opposite outer end 320 of conveyor belt 300. This independent collapsibility may enable conveyor belt 300 to be propelled around turns. That is, when being propelled around a turn, the outer end 320 of conveyor belt 300 that is on the inside of the turn may collapse longitudinally, whereas the outer end 320 on the outside of the turn may remain expanded longitudinally. Such a conveyor belt may be referred to as a "turn-curve" conveyor belt.

Conveyor belt 300 may be driven, pulled, propelled, and/or guided by a structure such as a drum 365. Drum 365 may have a drive surface 370, which may contact outer end 320 of conveyor belt 300. In some embodiments, drum 365 may be configured to simply guide conveyor belt 300 along a designated path. That is, a separate drive mechanism may propel conveyor belt 300, and drum 365 may guide conveyor belt 300 along the designated path. In other embodiments, drum 365, in addition to guiding conveyor belt 300, may also be configured to propel conveyor belt 300. Thus, conveyor belt 300 may be configured to contact drive surface 370.

The drive surface of the drum or other such propulsion or guidance device may be configured to engage a conveyor belt. The drive surface may be made of any suitable material for such contact. For example, the drive surface of the drum may be made of rubber, plastic, metal, and other suitable materials. These materials can be hard, abrasive, and/or may carry debris that acts as an abrasive during contact of the drive surface with the contact weld on an outer portion of the conveyor belt. In some embodiments, welds may be disposed on the outer legs of links in order to form a contact weld configured to engage the drive surface of the drum. The outer surface of the contact weld may form the outermost surface of the conveyor belt.

As shown in FIG. 3, contact welds 375 may be disposed at the outer ends of rods 310. Thus, contact welds 375 may each form an outermost surface of the conveyor belt configured to contact drive surface 370 of conveyor belt 300.

Figure 4:
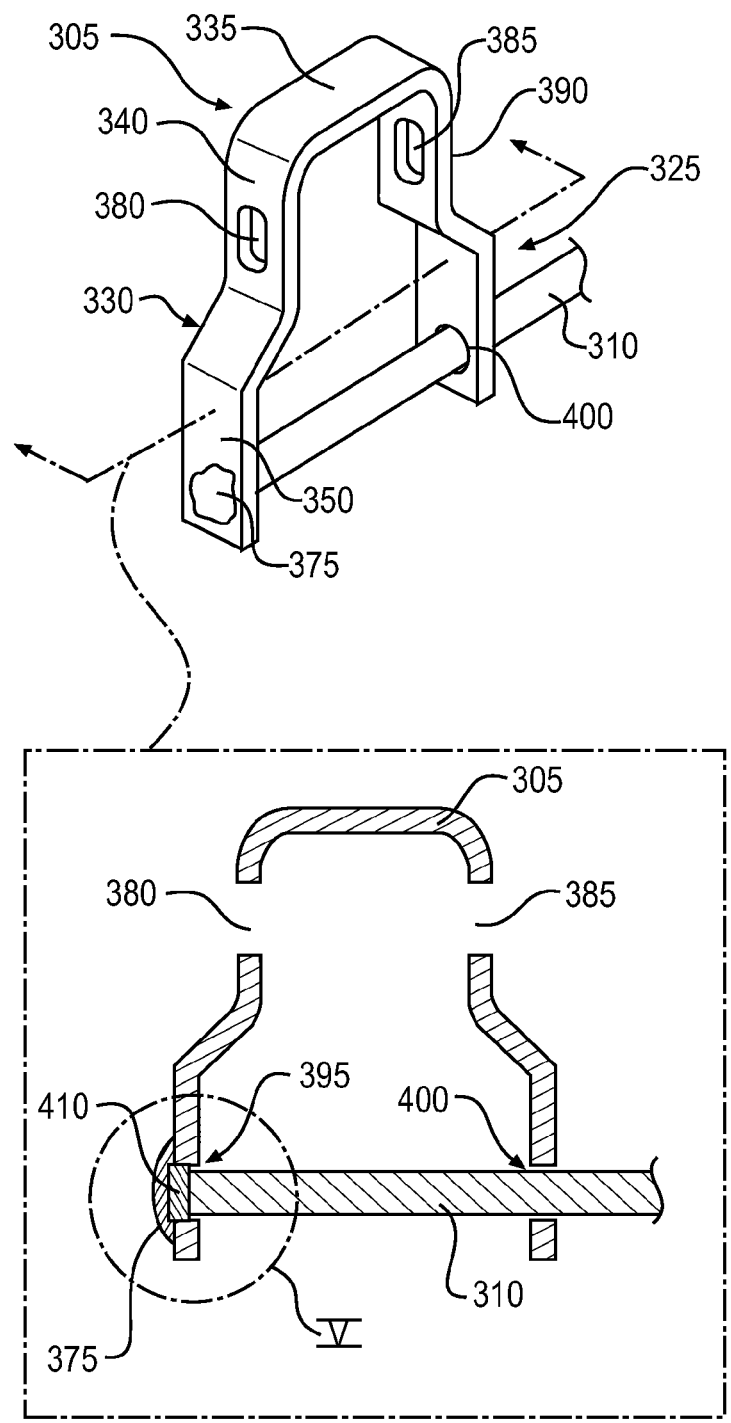
FIG. 4 is a schematic illustration of perspective and cross-sectional views of an exemplary link and rod assembly of a conveyor belt.

FIG. 4 illustrates perspective and cross-sectional views of a portion of belt assembly 360 of conveyor belt 300. As shown in FIG. 4, link 305 may include an outer slot 380 in upper portion 340 of outer leg 330. Link 305 may also include an inner slot 385 in an upper portion 390 of inner leg 325. When the illustrated belt segment is assembled with adjacent belt segments, the rod from another belt segment passes through outer slot 380 and inner slot 385. The elongation of slots 380 and 385 enables the longitudinal collapse and expansion of conveyor belt 300, as discussed above.

As shown in FIG. 4, rod 310 may be disposed within an aperture 395 in outer leg 330 of link 305 and within an aperture 400 in inner leg 325 of link 305. It should be noted that, although rod 310 is illustrated in FIG. 4 as being solid, embodiments are also envisioned in which rod 310 may be hollow. Outer leg 330 may be configured to receive rod 310 within aperture 395, and may be fixedly attached within aperture 395. For example, rod 310 may be fixedly attached to outer leg 330 with a first weld 410.

The conveyor belt may include features for preventing or reducing wear of outer (i.e., side) surfaces of the belt. For example, the belt may include a contact weld on an outer-facing surface of the outer leg of the link, wherein the weld forms an outer-most surface of the conveyor belt configured to contact the drive surface of the drum. In some embodiments, the contact weld material may be more resistant to wear than other components of the link that, absent the wear resistant contact weld, would be contacted by the drum during operation. In some embodiments, the contact weld may be an overweld, that is, a second weld over a first weld fixing the first rod to the outer leg of the link. In other embodiments, the contact weld may be the only weld on the outer leg of the link, and thus, may not only serve as a wear resistant outer-most surface of the conveyor belt, but also may serve as the means of fixation of the rod within the outer leg of the link.

The contact weld may be formed to be more resistant to wear than other components of the conveyor belt in any suitable way. The contact weld may be formed of a different material than the first weld and/or other components of the conveyor belt. For example, in some embodiments, the material used for the contact weld may be a material that is more wear resistant than the underlying materials (that is, the first weld, the rod, and the outer leg of the link). For example, the filler material used for the contact weld may be a more wear resistant material than the underlying materials. In some embodiments, the filler material may not necessarily be a more wear resistant material, but when combined with the relatively small amounts of the underlying materials that melt and mix with the filler, the resulting weld may be more wear resistant than the underlying materials.

In some embodiments, the contact weld may be more wear resistant by virtue of being harder than the underlying materials. That is, since harder materials are often more wear resistant, a filler material may be selected for the contact weld that is harder, or at least creates a weld that is harder, than the underlying material.

In some embodiments, the contact weld may be more resistant to wear by having a relatively smooth outer surface, having a low surface roughness. The smooth surface may reduce friction between the conveyor belt and the drum, which may reduce the amount of wear caused by the contact between the conveyor belt and the drum.

In some embodiments, the contact weld may be more wear resistant by being formed of a material that is more durable. For example, contact weld may be formed of a material that, despite having a hardness that is similar to, or less than, the hardness of the underlying materials, contact weld may be more resistant to wear by being formed of a material that has a high durability, such as cross-linked polymers, heat treated metals, and other suitable materials.

The links and rods may be made from any of a wide variety of materials, including metals, such as steel, stainless steel, aluminum, titanium, alloys, and other metals; polymers/plastics, such as thermoplastics, vinyl, polyurethane, polyethylene, and other suitable such materials; and/or other non-metallic materials, including silicon-based materials, such as ceramics, as well as other non-metallic materials, for example, graphite, carbon fiber, and other carbon-based, non-metallic materials. Accordingly, the materials from which the contact weld may be formed may vary significantly as well. Filler materials that may be used to form the contact weld may include, for example, metals, thermoplastics, silicon-based materials, such as ceramics, as well as carbon-based materials, such as graphite, and other suitable materials.

In some embodiments, as shown in FIG. 4, contact weld 375 may be added as a second weld at least partially over first weld 410 and may form an outer most surface of conveyor belt 300. Contact weld 375 may include a material that is more resistant to wear due to contact with drive surface 370 than first weld 410. In addition, in some embodiments, contact weld 375 may be more resistant to wear than outer leg 330 and/or rod 310.

It should be noted that welding processes involve the melting of small portions of the underlying materials to form a weld pool with the filler material, which hardens into the weld. For purposes of discussion, the appended drawings depict welds and components joined by the welds as discrete components. It will be appreciated, however, that the junctions between such components may be more transitional, that is, including adjoining portions formed of a mixture of the materials of the components (and the filler material). In addition, in some embodiments, instead of contact welds, the conveyor belt may include contact members that are brazed or soldered onto the outer legs of the links and/or, in some cases, onto underlying welds or directly to the rods. Brazing and soldering does not involve the melding of the underlying material (the workpiece). In brazing and soldering, only the added material is melted. In addition, in some embodiments, the rod may be fixed to the link using brazing or soldering. The embodiment including a wear resistant overweld may be applicable to conveyor belts assembled using brazing or soldering, as well as welding.

Figure 5:
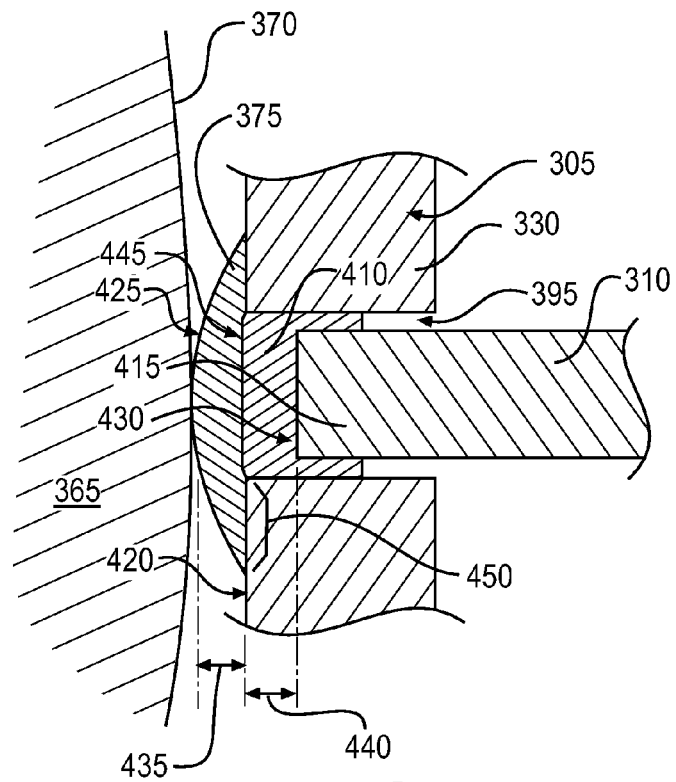
FIG. 5 is a schematic close-up cross-sectional view of a portion of a conveyor belt taken at line V in FIG. 4.

FIG. 5 is a close-up cross-sectional view of area V of FIG. 4, illustrating a section of lower portion 350 of outer leg 330 of link 305. Rod 310 may have a free end 415, extending into, and in some cases through, aperture 395. As shown in FIG. 5, rod 310 may be disposed within aperture 395 in outer leg 330 of link 305, and may be fixed within aperture 395 proximate free end 415 by first weld 410.

In the appended figures, the gap between the link and the rod is exaggerated for purposes of explanation. For example, the gap between link 305 and rod 310 in aperture 395 is exaggerated for clarity during discussion. In manufacture, this gap may be significantly smaller, for example, with contact between rod 310 and link 305 within aperture 395 on at least a portion of the circumferential perimeter of rod 310.

In some embodiments, contact weld 375 may be included. As shown in FIG. 5, in some embodiments, contact weld 375 may be an overweld, that is, a second weld formed over a free first weld 410, rod 310, and/or portions of an outer link surface 420. Contact weld 375 may define an outer-most surface 425 of conveyor belt 300 that is configured to face drive surface 370 of drum 365. Being "outer-most," outer-most surface 425 may extend further outward than outer link surface 420. This may enable most or all of the contact between drive surface 370 of drum 365 and the conveyor belt 300 to occur against contact weld 375, which may be configured to be more wear resistant than other components of conveyor belt 300. For example, outer-most surface 425 may extend a distance, indicated by dimension 435, outward from outer link surface 420.

While the drive surface of the drum may cause wear of the conveyor belt components, the conveyor belt components may also wear the drive surface. For example, large and/or sharp projections, protruding from the outer surface of the outer link leg, such as buttonheaded rods, may cause wear to the drive surface of the drum. In some cases, such projections may cause the removal of chunks of the drive surface. Consequently, it may be desirable to form the contact weld with a relatively low profile. In some embodiments, the links may be held together with buttonless rods. The term "buttonhead," in the context of conveyor belts, as will be recognized by skilled artisans, refers to a bulbous protrusion at an outer end of a rod. Such a bulbous protrusion not only protrudes from the outer surface of the link, but also has a diameter that is larger than the opening in the link leg through which the rod passes to prevent the rod from coming out of place. The term "buttonless," as will also be recognized by those having ordinary skill in the art, refers to rods not having buttonheads and, more specifically, to rods that terminate at free ends that have a diameter that is substantially the same or smaller than the rest of the rod. It shall also be understood, however, that "buttonless" does not preclude the possibility that a small stepped area could overlay the link aperture so that the small stepped area is substantially co-planar with the outer link surface without being precisely flush with the outer link surface.

Detailed explanations of buttonheaded and buttonless conveyor belt rods are provided in U.S. Patent Application Publication No. 2008/0169173 and U.S. Patent Application Publication No. 2010/0236902, which are incorporated herein by reference. Another benefit of buttonless rods, which is explained in these publications, is that, without the buttonheads, the conveyor has fewer areas that are susceptible of accumulating debris, such as food.

One way in which the contact weld may be provided with a relatively low profile, such as a buttonless configuration, may be recessing the end face of the rod within the aperture. In such embodiments, the remainder of the aperture may be filled with weld material.

In some embodiments, rod 310 may terminate within aperture 395 at an end face 430 that is located inward of outer link surface 420, as shown in FIG. 5. For example, end face 430 may be recessed inward of outer link surface 420 by a distance dimension 440. In some embodiments, first weld 410 may fill all or some of the portion of aperture 395 between end face 430 of rod 310 and outer link surface 420. For example, as shown in FIG. 5, first weld 410 may substantially fill the remainder of aperture 395. In some embodiments, an outer surface 445 of first weld 410 may be disposed substantially flush or substantially coplanar with outer link surface 420, as shown in FIG. 5. In some embodiments, outer surface 445 of first weld 410 may be precisely flush/coplanar with outer link surface 420. In other embodiments, outer surface 445 of first weld 410 may be substantially flush/coplanar with outer link surface 420, having a relatively small protruding or recessed portion. FIG. 3 illustrates an embodiment, wherein outer surface 445 of first weld 410 extends slightly outward of outer link surface 420, but remains substantially flush/coplanar with outer link surface 420.

As further shown in FIG. 5, contact weld 375 may cover first weld 410. In some embodiments, contact weld 375 may completely cover first weld 410. In addition, in some embodiments, contact weld 375 may cover at least a portion of outer leg 330 of link 305. For example, as shown in FIG. 5, contact weld 375 may cover a portion 450 of outer link surface 420.

In some embodiments, the first weld may extend outward a small amount from the outer link surface. The contact weld may cover the first weld in a similar manner to embodiments having first welds that are substantially flush/coplanar with the outer link surface. However, by extending the first weld outward from the outer link surface, a smaller amount of material may be used for the contact weld. This may be desired, as more wear resistant materials used for the contact welds may be more expensive than the materials used for the first weld. Thus using more first weld material and less contact weld material may be advantageous from a cost perspective.

Figure 6:
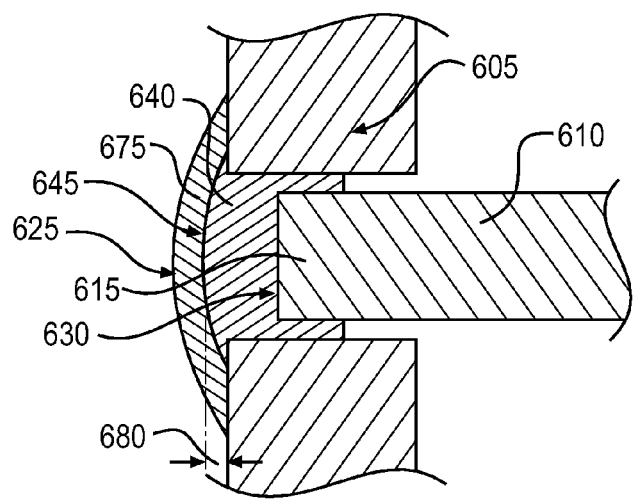
FIG. 6 is a schematic close-up cross-sectional view of a portion of another conveyor belt embodiment.

FIG. 6 illustrates a close-up cross-sectional view of a conveyor belt embodiment similar to that shown in FIG. 5. As shown in FIG. 6, a rod 610 may be disposed in a link 605. A free end 615 of rod 610 may be welded within an aperture in link 605 with a first weld 640. First weld 640 may have an outer surface 645 that extends outward from link 605. For example, first weld may extend outward from link 605 by a distance indicated by dimension 680 in FIG. 6. As compared to the embodiment shown in FIG. 5, in both embodiments, the outer dimensions of the contact welds may be substantially the same but, in the embodiment shown in FIG. 6, less contact weld material may be used to provide the same outer dimensions. In some embodiments, contact weld 645 may be formed of a different material than first weld 640. In some embodiments, contact weld 645 may be more resistant to wear than first weld 640. In addition, contact weld may be more resistant to wear than link 605 and/or rod 610.

As shown in FIG. 6, in some embodiments, first weld 640 may be completely covered by a contact weld 675, which may form an outermost surface of the conveyor belt. As also shown in FIG. 6, in some embodiments, contact weld 675 may completely cover not only first weld 640, but also free end 615 of rod 610, as well as the aperture.

Figure 7:
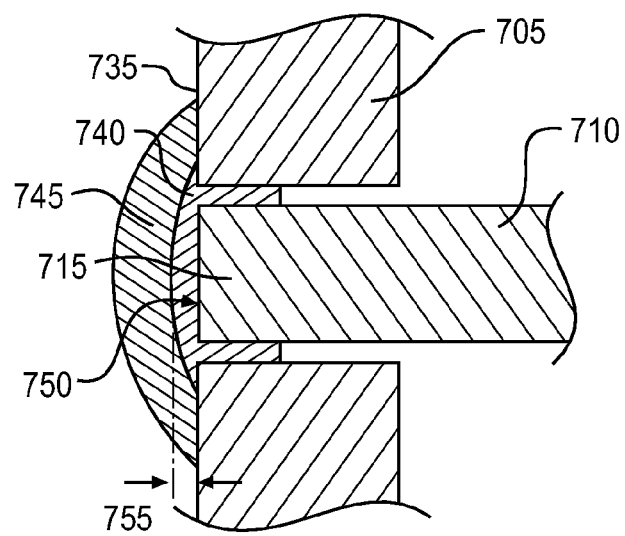
FIG. 7 is a schematic close-up cross-sectional view of a portion of another conveyor belt embodiment.

FIG. 7 illustrates a close-up cross-sectional view of another conveyor belt embodiment. As shown in FIG. 7, the conveyor belt may include a link 705 and a rod 710, having a free end 715 disposed in an aperture of link 705. Free end 715 of rod 710 may be welded within the aperture with a first weld 740. A contact weld 745 may be formed over first weld 740, free end 715 of rod 710, and/or the aperture. As illustrated in FIG. 7, in some embodiments, rod 710 may terminate within the aperture at an end face 750 that is substantially flush or coplanar with an outer link surface 735. Accordingly, first weld 740 may extend outward from end face 750 of rod 710 by a distance indicated by dimension 755 in FIG. 7.

In some embodiments, contact weld 745 may be formed of a different material than first weld 740. In some embodiments, contact weld 745 may be more resistant to wear than first weld 740. In addition, contact weld may be more resistant to wear than link 705 and/or rod 710.

Figure 8:
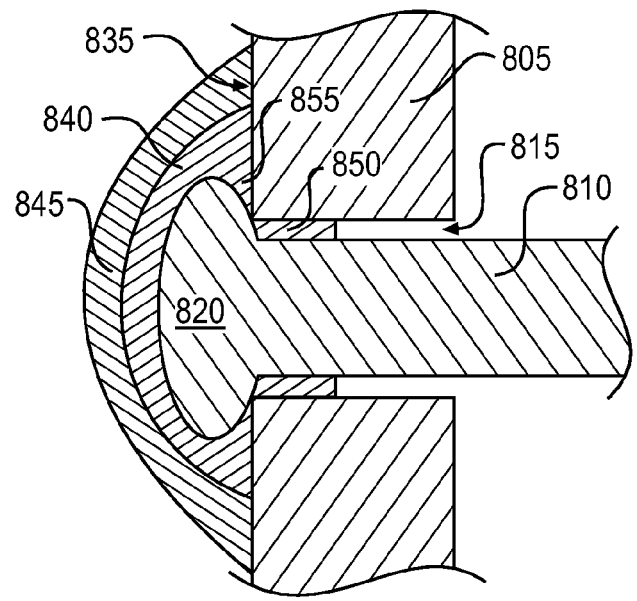
FIG. 8 is a schematic close-up cross-sectional view of a portion of another conveyor belt embodiment.

FIG. 8 illustrates a close-up cross-sectional view of another conveyor belt embodiment. As shown in FIG. 8, the conveyor belt may include a link 805 connected to a rod 810. Rod 810 may be disposed within an aperture 815 and may terminate with a buttonhead 820 that is larger than aperture 815. Such a rod 810 may thus terminate at an end face that is located outward of an outer link surface 835. Rod 810 may be welded within aperture 815 with a first weld 840. In addition, a contact weld 845 may be formed over first weld 840, buttonhead 820, and/or aperture 815. In some embodiments, as illustrated in FIG. 8, in some embodiments, contact weld 845 may completely cover first weld 840, buttonhead 820, and/or aperture 815.

In some embodiments, contact weld 845 may be formed of a different material than first weld 840. In some embodiments, contact weld 845 may be more resistant to wear than first weld 840. In addition, contact weld may be more resistant to wear than link 805 and/or rod 810.

As shown in FIG. 8, first weld 840 may include an inner weld portion 850 within aperture 815 and an outer weld portion 855 disposed on outer link surface 835 of link 805. In some embodiments, inner weld portion 850 may be omitted, and outer weld portion 855 may be the only means of fixation of button head 820 to link 805. Also, as shown in FIG. 8, in some embodiments, first weld 840 and contact weld 845 may each completely cover buttonhead 820, aperture 815, and/or a portion of outer link surface 835.

In some embodiments, the welds may be formed in a manner that reduces the amount of weld material used and enables the contact weld to be formed with a relatively low profile. For example, in some embodiments, the first weld may be formed only on a side region of the button head. In some embodiments, the first weld may be formed only on one side of the button head. In other embodiments, the weld may extend around a circumference of the button head. By omitting first weld material from the outer end of the buttonhead, the contact weld may be added, while still maintaining a relatively low profile. Such smaller, and selectively placed first welds may be utilized depending on the demands of the conveyor belt. Heavy duty belts may use larger first welds, whereas belts intended for transporting lighter wares, for example, may utilize relatively smaller first welds.

Figure 9:
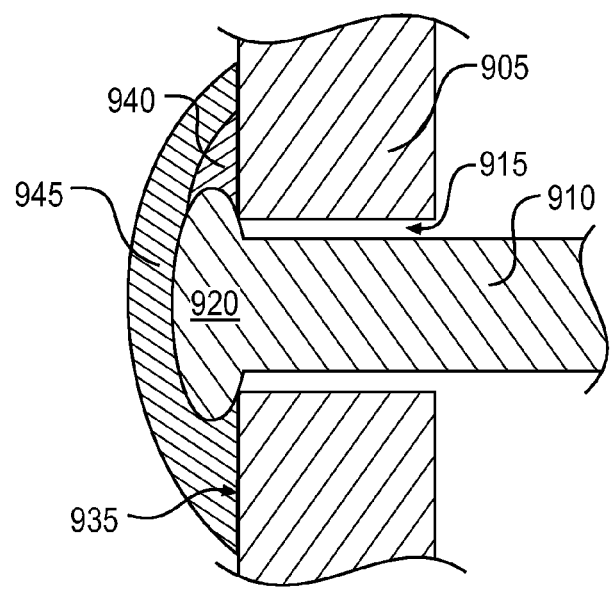
FIG. 9 is a schematic close-up cross-sectional view of a portion of another conveyor belt embodiment.

FIG. 9 illustrates a close-up cross-sectional view of another conveyor belt embodiment. As shown in FIG. 9, the conveyor belt may include a link 905 connected to a rod 910. Rod 910 may be disposed within an aperture 915 and may terminate with a buttonhead 920 that is larger than aperture 915. Rod 910 may be welded to an outer surface 935 of link 905 with a first weld 940. As shown in FIG. 9, first weld 940 may be disposed only one on side portion of buttonhead 920. In addition, a contact weld 945 may be formed over buttonhead 920 and first weld 940.

In some embodiments, contact weld 945 may be formed of a different material than first weld 940. In some embodiments, contact weld 945 may be more resistant to wear than first weld 940. In addition, contact weld may be more resistant to wear than link 905 and/or rod 910.

Smaller first weld 940 may be used, depending on the service demands of the conveyor belt. In addition, using a second weld such as contact weld 945 that completely covers buttonhead 920 and further contacts outer link surface 935, may add to the strength of the attachment between rod 910 and link 905. Accordingly the first weld 940 may be relatively smaller, as more of the structural support/fixation is provided by contact weld 945. This provides a low profile, and light weight, minimal use of first weld material.

Figure 10:
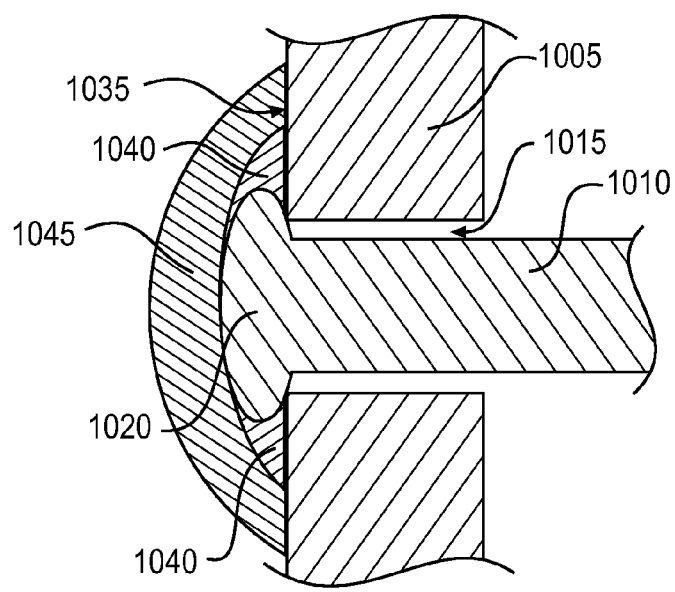
FIG. 10 is a schematic close-up cross-sectional view of a portion of another conveyor belt embodiment.

FIG. 10 illustrates a close-up cross-sectional view of another conveyor belt embodiment with first welds disposed on side portions of a buttonhead. As shown in FIG. 10, the conveyor belt may include a link 1005 connected to a rod 1010. Rod 1010 may be disposed within an aperture 1015 and may terminate with a buttonhead 1020 that is larger than aperture 1015. Rod 1010 may be welded to an outer surface 1035 of link 1005 with a first weld 1040. As shown in FIG. 10, first weld 1040 may be disposed about a circumference of buttonhead 920. In addition, a contact weld 1045 may be formed over buttonhead 1020 and first weld 1040.

In some embodiments, contact weld 1045 may be formed of a different material than first weld 1040. In some embodiments, contact weld 1045 may be more resistant to wear than first weld 1040. In addition, contact weld 1045 may be more resistant to wear than link 1005 and/or rod 1010.

In some embodiments, a single, wear resistant weld may be used on the outer leg of each link, instead of two welds. In such embodiments, the weld may be formed of a material having more resistance to wear than the link and/or the rod. The single weld may provide fixation of the rod to the link and may also serve as a contact surface configured to contact the drive surface of the drum. By using only one weld, a reduced amount of weld material may be used overall, and the profile of the weld may be made relatively shallow.

Figure 11:
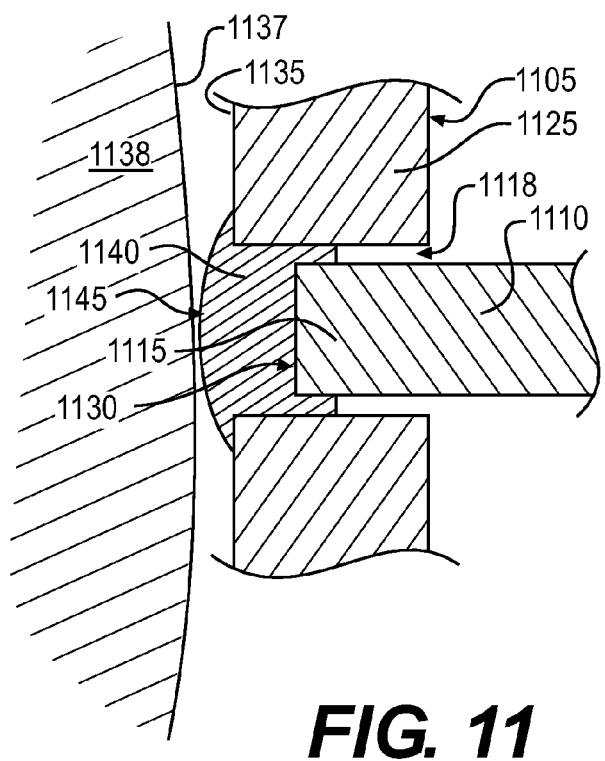
FIG. 11 is a schematic close-up cross-sectional view of a portion of another conveyor belt embodiment.

FIG. 11 illustrates a close-up cross-sectional view of another conveyor belt embodiment. As shown in FIG. 11, the conveyor belt may include a link 1105 configured to receive a rod 1110. Rod 1110 may include an elongated portion of a rod material having a free end 1115, end face 1130. Rod 1110 may be disposed within an aperture 1118 of an outer leg 1125 of link 1105. Rod 1110 may be fixed within aperture 1115 with a contact weld 1140.

Contact weld 1140 may extend further outward than an outer link surface 1135 configured to face a drive surface 1137 of a drum 1138 configured to propel and/or guide the conveyor belt. Therefore, contact weld 1140 may be configured to contact drive surface 1137 of drum 1138. In some embodiments, contact weld 1140 may be more resistant to wear than link 1105 and, in some embodiments, more resistant to wear than rod 1110. Exemplary ways in which a weld may be formed with wear resistance properties are discussed above. For example, outer leg 1125 of link 1105 may be formed of a leg link material. In some embodiments, contact weld 1140 may be formed of a material that is harder than the leg link material. Exemplary such materials are discussed above.

In some embodiments, end face 1130 may be located inward of outer link surface 1135, as shown in FIG. 11. As discussed above, this may enable contact weld 1140 to be formed with a relatively shallow profile. In addition, as also shown in FIG. 11, contact weld 1140 may completely cover free end 1115 of rod 1110. Further, in some embodiments, contact weld 1140 may completely cover aperture 1118. In addition, contact weld 1140 may completely cover a portion of outer leg 1125 of link 1105.

Figure 12:
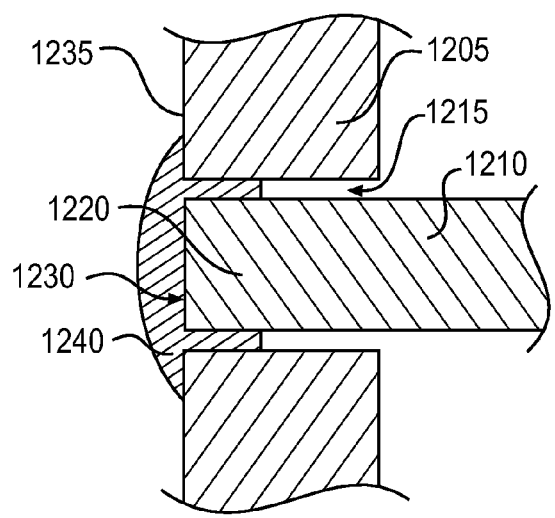
FIG. 12 is a schematic close-up cross-sectional view of a portion of another conveyor belt embodiment.

FIG. 12 illustrates a close-up cross-sectional view of another conveyor belt embodiment. FIG. 12 illustrates conveyor belt components including a link 1205, having a rod 1210 fixed within an aperture 1215, wherein rod 1210 terminates within aperture 1215 at a free end 1220 of rod 1210. As shown in FIG. 12, rod 1210 may be fixed within aperture 1215 with a contact weld 1240. These components of FIG. 12 may be configured in substantially the same manner as the components of FIG. 11 discussed above, except that, as shown in FIG. 12, an end face 1230 of rod 1210 may be disposed substantially flush or coplanar with outer link surface 1235.

Figure 13:
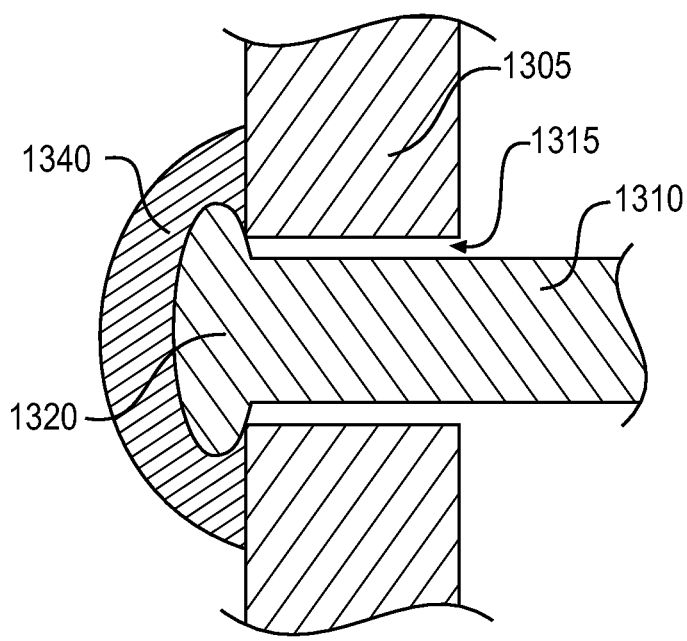
FIG. 13 is a schematic close-up cross-sectional view of a portion of another conveyor belt embodiment.

FIG. 13 illustrates a close-up cross-sectional view of another conveyor belt embodiment. As shown in FIG. 13, a link 1305 may receive a rod 1310 within an aperture 1315. In some embodiments, rod 1310 may terminate in a buttonhead 1320 that is larger than aperture 1315. In addition, a contact weld 1340 may affix rod 1310 to link 1305 and cover at least a portion of buttonhead 1320 in order to provide an outer-most surface of the conveyor belt configured to contact a drive surface of a drum or other conveyor belt propulsion and/or guide apparatus. In some embodiments, weld 1340 may completely cover buttonhead 1320, as shown in FIG. 13. In some embodiments, contact weld 1340 may be formed of a material that is more resistant to wear than link 1305 and/or rod 1310.

As discussed above, it may be desirable, in some cases, to reduce the amount of material used for the welds. This may be for reasons of material costs, weight, or other considerations. In addition, as also discussed above, it may be desirable for the welds to have a relatively low profile. That is, it may be desirable for the welds to extend beyond the outer link surface by only a small amount. Reasons for using low profile welds may be based on factors such as cost and weight mentioned above, as well as to reduce the amount of wear and other structural damage that the welds may cause to the drive surface of the drum. In addition, low profile welds may be less likely to trap debris, such as foot pieces.

For the foregoing reasons, exemplary embodiments are discussed below, that provide a low profile and/or use a reduced amount of material. For example, the following embodiments utilize welds that cover only portions of the rod and/or aperture.

Figure 14:
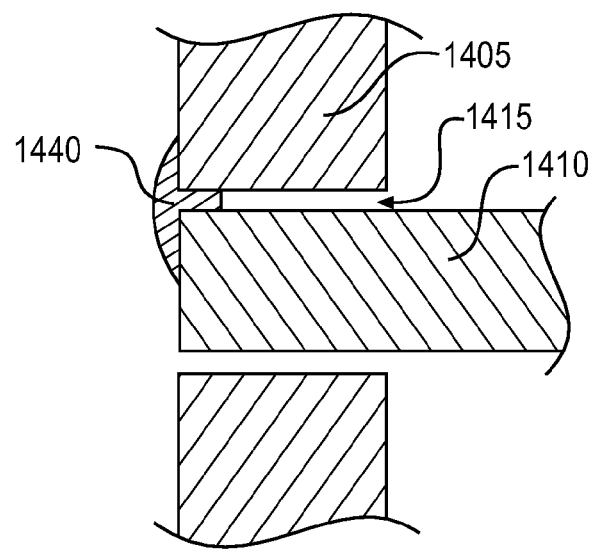
FIG. 14 is a schematic close-up cross-sectional view of a portion of another conveyor belt embodiment.

FIG. 14 illustrates a close-up cross-sectional view of another conveyor belt embodiment. FIG. 14 illustrates conveyor belt components including a link 1405, having a rod 1410 fixed within an aperture 1415. As shown in FIG. 14, a single offset contact weld 1440 may be formed joining link 1405 with rod 1410. In some embodiments, contact weld 1440 may be disposed at an off-center portion of rod 1410 and aperture 1415. Accordingly, single contact weld 1440 may affix rod 1410 to link 1405 and cover at least a portion of rod 1410 and link 1405, in order to provide an outer-most surface of the conveyor belt configured to contact a drive surface of a drum or other conveyor belt propulsion and/or guide apparatus. In some embodiments, contact weld 1440 may be formed of a material that is more resistant to wear than link 1405 and/or rod 1410.

Figure 15:
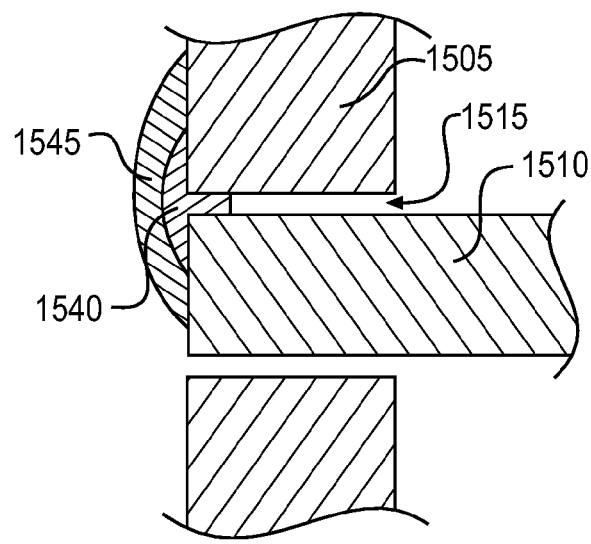
FIG. 15 is a schematic close-up cross-sectional view of a portion of another conveyor belt embodiment.

FIG. 15 illustrates a close-up cross-sectional view of another conveyor belt embodiment. FIG. 15 shows a link 1505, a rod 1510, and an aperture 1515 arranged in a similar fashion to the components in FIG. 14 discussed above. The embodiment shown in FIG. 15, however, may include not only a first weld 1540 disposed at an off-center portion of rod 1510 and aperture 1515, but also a contact weld 1545, covering first weld 1540. As shown in FIG. 15, contact weld 1545 may be substantially centered in its placement over first weld 1540. In other embodiments, contact weld 1545 and first weld 1540 may be offset.

In some embodiments, contact weld 1545 may be formed of a different material than first weld 1540. In some embodiments, contact weld 845 may be more resistant to wear than first weld 1540. In addition, contact weld may be more resistant to wear than link 1505 and/or rod 1510.

Figure 16:
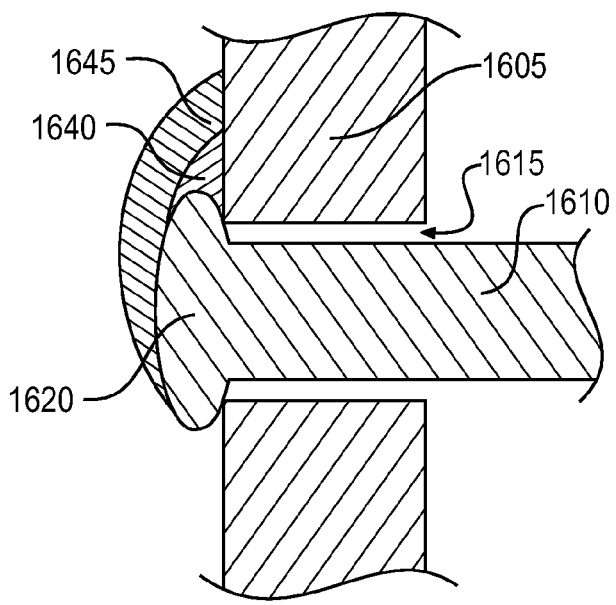
FIG. 16 is a schematic close-up cross-sectional view of a portion of another conveyor belt embodiment.

FIG. 16 illustrates a close-up cross-sectional view of another conveyor belt embodiment. As shown in FIG. 16, a link 1605 may receive a rod 1610 within an aperture 1615. In some embodiments, as shown in FIG. 16, rod 1610 may terminate in a buttonhead 1620 that is larger than aperture 1615. In addition, a first weld 1640 may affix rod 1610 to link 1605 and cover at least a portion of buttonhead 1620. In addition, a contact weld 1645 may be added over first weld 1640, in order to provide an outer-most surface of the conveyor belt configured to contact a drive surface of a drum or other conveyor belt propulsion and/or guide apparatus. In some embodiments, contact weld 1645 may partially cover buttonhead 1620, as shown in FIG. 16.

In some embodiments, contact weld 1645 may be formed of a different material than first weld 1640. In some embodiments, contact weld 1645 may be more resistant to wear than first weld 1640. In addition, contact weld may be more resistant to wear than link 1605 and/or rod 1610.

Figure 17:
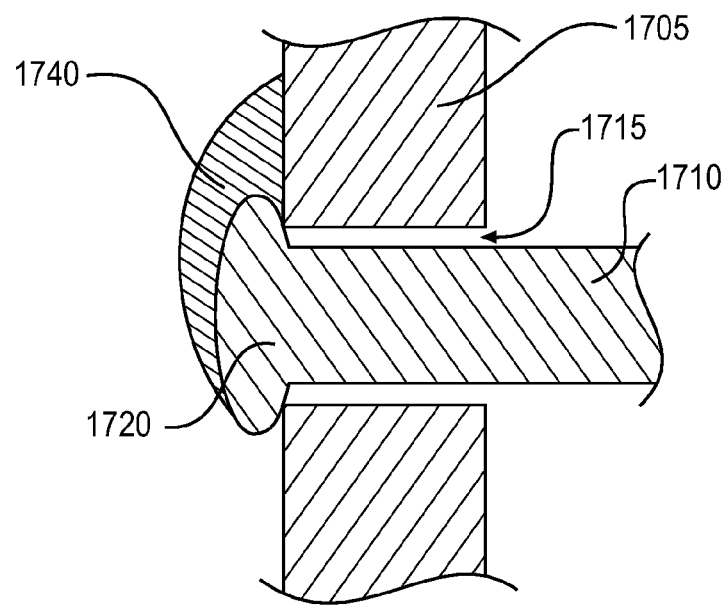
FIG. 17 is a schematic close-up cross-sectional view of a portion of another conveyor belt embodiment.

FIG. 17 illustrates a close-up cross-sectional view of another conveyor belt embodiment. FIG. 17 shows a link 1705, a rod 1710, an aperture 1715, and a buttonhead 1720 arranged in a similar fashion to the components in FIG. 16 discussed above. The embodiment shown in FIG. 17, however, may be provided with only a single contact weld 1740 on the outer leg of link 1705. As shown in FIG. 17, contact weld 1740 may be offset with respect to buttonhead 1720, and may partially cover buttonhead 1720. In some embodiments, contact weld 1440 may be formed of a material that is more resistant to wear than link 1405 and/or rod 1410.

In view of the advantages, discussed above, of using less material for welds, it may be desirable to include relatively small contact welds. In some embodiments, relatively smaller contact welds may be provided that are disposed on a first weld or a button head, but which do not contact an outer surface of the link.

Figure 18:
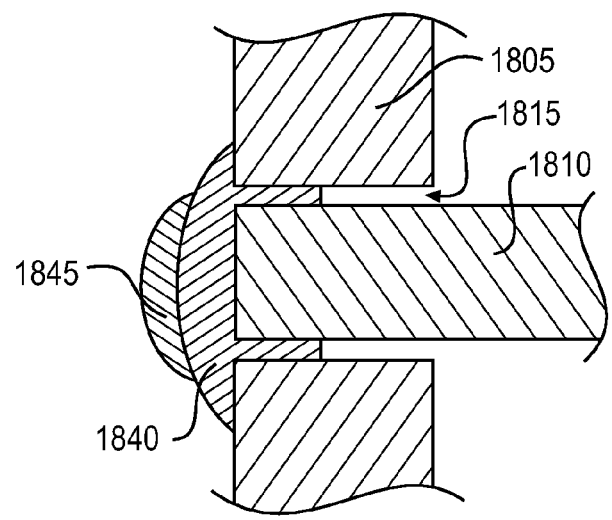
FIG. 18 is a schematic close-up cross-sectional view of a portion of another conveyor belt embodiment.

FIG. 18 illustrates a close-up cross-sectional view of another conveyor belt embodiment. FIG. 18 shows a link 1805 having a rod 1810 fixed within an aperture 1815 in an outer leg of link 1805. A first weld 1840 may join link 1805 and rod 1810. In addition, a contact weld 1845 may be disposed on first weld 1840. In some embodiments, contact weld 1845 may be substantially smaller than first weld 1840. In such embodiments, contact weld 1845 may form an outer surface of the conveyor belt configured to contact a drive surface of a drum, however, contact weld 1845 may not be in contact with the outer surface of link 1905.

In some embodiments, contact weld 1845 may be formed of a different material than first weld 1840. In some embodiments, contact weld 1845 may be more resistant to wear than first weld 1840. In addition, contact weld may be more resistant to wear than link 1805 and/or rod 1810.

Figure 19:
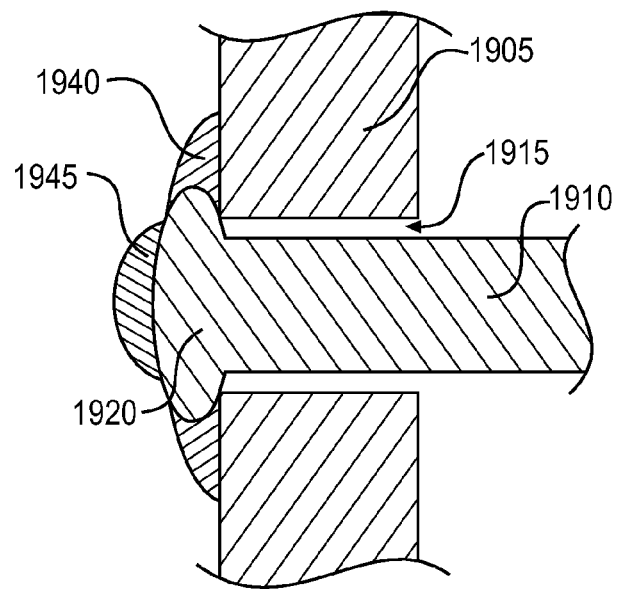
FIG. 19 is a schematic close-up cross-sectional view of a portion of another conveyor belt embodiment

FIG. 19 illustrates a close-up cross-sectional view of another conveyor belt embodiment. FIG. 19 shows a link 1905 having a rod 1910 received in an aperture 1915. In addition, rod 1910 may terminate in a buttonhead 1920 that is larger than aperture 1915. A first weld 1940 may be provided about a circumference of buttonhead 1920. In addition, a relatively small contact weld 1945 may be disposed on buttonhead 1920. In some embodiments, contact weld 1945 may not be in contact with first weld 1940. In some embodiments, contact weld 1945 may not be in contact with the outer surface of link 1905.

In some embodiments, contact weld 1945 may be formed of a different material than first weld 1940. In some embodiments, contact weld 1945 may be more resistant to wear than first weld 1940. In addition, contact weld may be more resistant to wear than link 1905 and/or rod 1910.

In some embodiments, components of the conveyor belt may be connected to one another via various types of attachments. For example, in some embodiments, at least some components may be secured to one another with adhesive. In some embodiments, at least some of the attachments may be metallic or non-metallic welds. In some embodiments, certain attachments may be adhesive, whereas other attachments may be welds.

In some embodiments, the conveyor belt may include a first attachment fixedly attaching the free end of the rod to the link leg. The first attachment may include a first attachment material. In addition, the conveyor belt may include a second attachment made of a second attachment material, wherein the second attachment covers at least a portion of an end face of the rod. In some embodiments, the second attachment may form an outermost surface of the conveyor belt configured to contact the drive surface.

In some embodiments, the second attachment material may be different from the first attachment material. In some embodiments, the second attachment material may be more resistant to wear due to contact with the drive surface than the first weld material. For example, in some exemplary embodiments, the first attachment material may be an adhesive and the second attachment may be a weld.

Using FIG. 19 as an example (although the concept of differing attachment materials may be applicable to any of the embodiments discussed above), in some embodiments, link 1905 may be formed of a silicon-based material, such as a ceramic, and rod 1910 may be a metal. In such embodiments, in lieu of first weld 1940, an adhesive attachment may be used. The second attachment material may include a metal. For example, second weld 1945 may be a metallic weld attached to a metallic rod 1910.

In some embodiments, the second attachment (e.g., first weld or attachment 1940) may be separated from the first attachment (e.g., second weld or attachment 1945).

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Features of any embodiment described in the present disclosure may be included in any other embodiment described in the present disclosure. Also, various modifications and changes may be made within the scope of the attached claims.

What is claimed is:

1. A conveyor belt configured to contact a drive surface, the conveyor belt comprising:
   a rod having a free end, wherein the rod comprises an elongated portion of a rod material;
   a link having a leg formed of a link leg material and configured to receive the rod, wherein the leg includes an outer link surface configured to face the drive surface;
   an aperture extending through the leg, wherein the rod is disposed within the aperture;
   a first weld that attaches the free end of the rod to the outer link surface, the first weld comprising a first weld material; and
   a second weld made of a second weld material, wherein the second weld covers at least a portion of the first weld and forms an outermost surface of the conveyor belt configured to contact the drive surface;
   wherein the second weld material is different from the first weld material, and wherein the second weld material is more resistant to wear than the first weld material.

2. The conveyor belt according to claim 1, wherein the second weld completely covers the first weld.

3. The conveyor belt according to claim 1, wherein the second weld completely covers the first weld and the free end of the rod.

4. The conveyor belt according to claim 1, wherein the second weld completely covers the first weld, the free end of the rod, and the aperture.

5. The conveyor belt according to claim 1, wherein the rod is solid.

6. The conveyor belt according to claim 1, wherein the second weld covers a portion of the link leg.

7. The conveyor belt according to claim 1, wherein the second weld material is harder than the first weld material.

8. The conveyor belt according to claim 1, wherein the second weld material is harder than the first weld material, the link leg material, and the rod material.

9. The conveyor belt according to claim 1, wherein the second weld material is metal, thermoplastic, a silicon-based material, or a carbon-based non-metallic material.

10. The conveyor belt according to claim 1, wherein the link leg material is metal, thermoplastic, a silicon-based material, or a carbon-based non-metallic material.

11. The conveyor belt according to claim 1, wherein the rod terminates within the aperture at an end face that is substantially flush with the outer link surface.

12. The conveyor belt according to claim 11, wherein an outer surface of the first weld protrudes outward beyond the outer link surface.

13. The conveyor belt according to claim 1, wherein the rod terminates at an end face that protrudes outward beyond the outer link surface.

14. The conveyor belt according to claim 13, wherein an outer surface of the first weld protrudes outward beyond the outer link surface.

15. The conveyor belt according to claim 1, wherein the rod terminates within the aperture at an end face that is located inward of the outer link surface.

16. The conveyor belt according to claim 15, wherein an outer surface of the first weld protrudes outward beyond the outer link surface.

17. The conveyor belt according to claim 15, wherein an outer surface of the first weld is substantially flush with the outer link surface.

18. The conveyor belt according to claim 1, wherein the rod terminates at an end face that is located outward of the outer link surface.

19. The conveyor belt according to claim 18, wherein an outer surface of the first weld protrudes outward beyond the outer link surface.

20. The conveyor belt according to claim 1, wherein the rod terminates in a buttonhead that is larger than the aperture.

21. The conveyor belt according to claim 20, wherein the second weld partially covers the buttonhead.

22. The conveyor belt according to claim 20, wherein the second weld completely covers the buttonhead.

23. A conveyor belt configured to contact a drive surface, the conveyor belt comprising:
   a rod having a free end, wherein the rod comprises an elongated portion of a rod material;
   a link having a leg formed of a link leg material and configured to receive the rod, wherein the leg includes an outer link surface configured to face the drive surface;
   an aperture extending through the leg, wherein the rod is disposed within the aperture;
   a weld that attaches the free end of the rod to the outer link surface and forms an outermost surface of the conveyor belt configured to contact the drive surface, the weld comprising a weld material, wherein the weld material is more resistant to wear than the rod material and the link leg material.

24. The conveyor belt according to claim 23, wherein the weld completely covers the free end of the rod.

25. The conveyor belt according to claim 23, wherein the weld completely covers the aperture.

26. The conveyor belt according to claim 23, wherein the rod is solid.

27. The conveyor belt according to claim 23, wherein the weld also covers a portion of the link leg.

28. The conveyor belt according to claim 23, wherein the weld material is harder than the rod material and the link leg material.

29. The conveyor belt according to claim 23, wherein the weld material is metal, thermoplastic, a silicon-based material, or a carbon-based non-metallic material.

30. The conveyor belt according to claim 23, wherein the link leg material is metal, thermoplastic, a silicon-based material, or a carbon-based non-metallic material.

31. The conveyor belt according to claim 23, wherein the rod terminates within the aperture at an end face that is substantially flush with the outer link surface.

32. The conveyor belt according to claim 23, wherein the rod terminates at an end face that protrudes outward beyond the outer link surface.

33. The conveyor belt according to claim 23, wherein the rod terminates within the aperture at an end face that is located inward of the outer link surface.

34. The conveyor belt according to claim 23, wherein an outer surface of the weld protrudes outward beyond the outer link surface.

35. The conveyor belt according to claim 23, wherein the rod terminates in a buttonhead that is larger than the aperture.

36. The conveyor belt according to claim 35, wherein the weld partially covers the buttonhead.

37. The conveyor belt according to claim 35, wherein the weld completely covers the buttonhead.

38. A conveyor belt configured to contact a drive surface, the conveyor belt comprising:
   a rod having a free end, wherein the rod comprises an elongated portion of a rod material;
   a link having a leg formed of a link leg material and configured to receive the rod, wherein the leg includes an outer link surface configured to face the drive surface;
   an aperture extending through the leg, wherein the rod is disposed within the aperture;
   a first attachment fixedly attaching the free end of the rod to the link leg, the first attachment comprising a first attachment material; and
   a second attachment made of a second attachment material, wherein the second attachment covers at least a portion of an end face of the rod and forms an outermost surface of the conveyor belt configured to contact the drive surface;
   wherein the second attachment material is different from the first attachment material, and wherein the second attachment material is more resistant to wear than the first attachment material.

39. The conveyor belt according to claim 38, wherein the first attachment material is an adhesive and the second attachment is a weld.

40. The conveyor belt according to claim 39, wherein the second attachment material includes a metal.

41. The conveyor belt according to claim 40, wherein the rod material includes a metal.

42. The conveyor belt according to claim 38, wherein the first attachment is a weld.

43. The conveyor belt according to claim 38, wherein the second attachment is separated from the first attachment.

44. The conveyor belt according to claim 38, wherein the link leg material is silicon-based.

45. The conveyor belt according to claim 44, wherein the link leg material is a ceramic.

46. The conveyor belt according to claim 45, wherein the rod material is a metal and the first attachment material attaching the rod to the link leg is an adhesive and the second attachment includes a metallic weld material.

* * * * *